2 Sheets—Sheet 1.
J. M. FORDEN,
Assignor to A. RUNSTETLER.
Seed-Dropper.
No. 8,613. *Fig. 1.* Reissued Mar. 11, 1879.
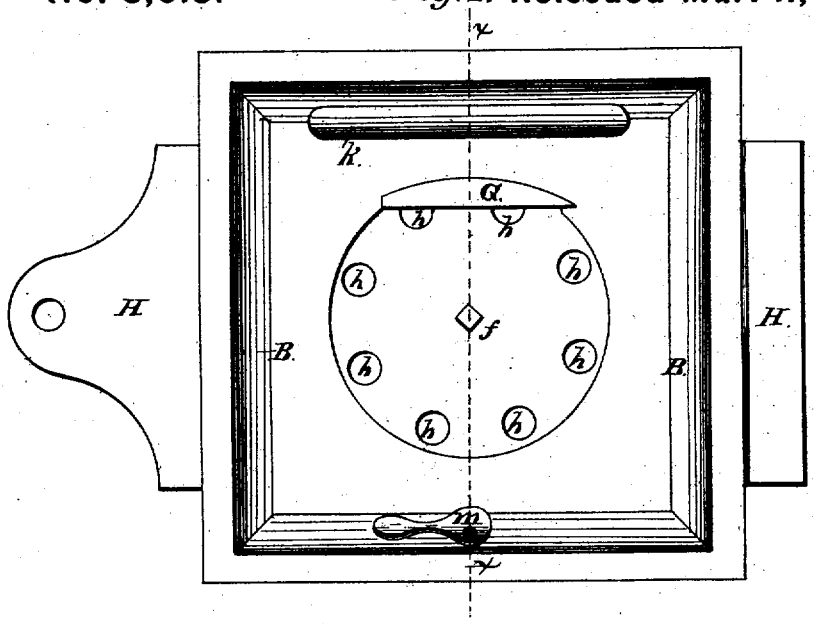
*Fig. 2.*
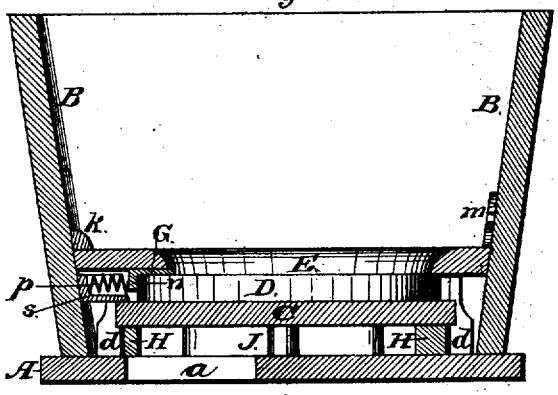
*Fig. 5.*
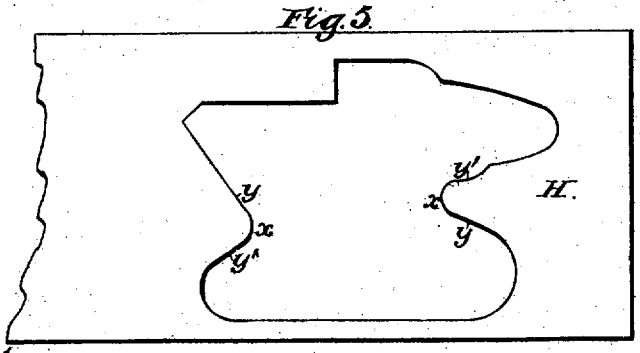
Attest:
F. W. Brock
D. G. Stuart
Inventor:
John M. Forden,
by W. B. Richards
Atty.
N. PETERS, PHOTO-LITHOGRAPHER, WASHINGTON, D. C.

J. M. FORDEN,

Assignor to A. RUNSTETLER.

Seed-Dropper.

No. 8,613. Reissued Mar. 11, 1879.

Attest:
F. P. Brock
D. G. Stuart

Inventor:
John M. Forden,
by W. B. Richards
Atty.

N. PETERS, PHOTO-LITHOGRAPHER, WASHINGTON, D. C.

UNITED STATES PATENT OFFICE.

JOHN M. FORDEN, OF SPRINGFIELD, ILLINOIS, ASSIGNOR TO ANDREW RUNSTETLER.

IMPROVEMENT IN SEED-DROPPERS.

Specification forming part of Letters Patent No. 144,327, dated November 4, 1873; Reissue No. 8,613, dated March 11, 1879; application filed January 15, 1879.

*To all whom it may concern:*

Be it known that I, JOHN M. FORDEN, of Springfield, in the county of Sangamon and State of Illinois, have invented certain new and useful Improvements in Seed-Droppers for Corn-Planters; and I do hereby declare that the following is a full, clear, and exact description of the invention, that will enable others skilled in the art to which it appertains to make and use the same, reference being had to the accompanying drawings, and to the letters of reference marked thereon, which form a part of this specification.

Figure 3:
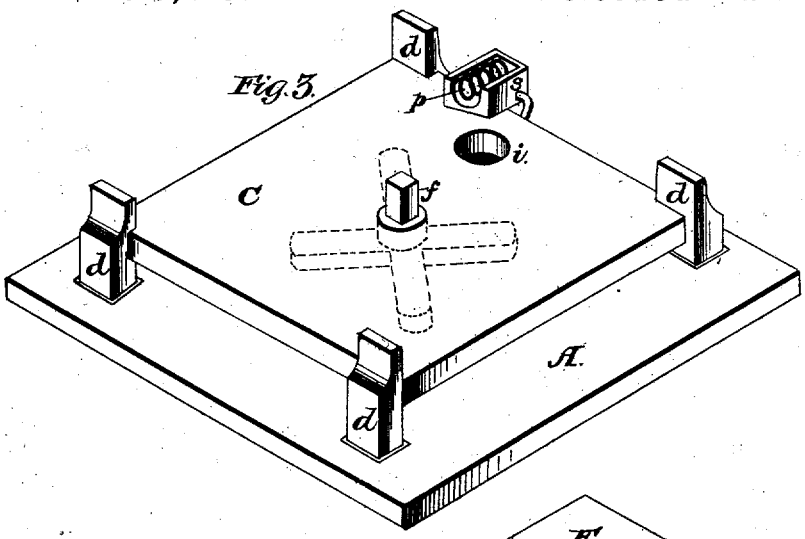
Figure 4:
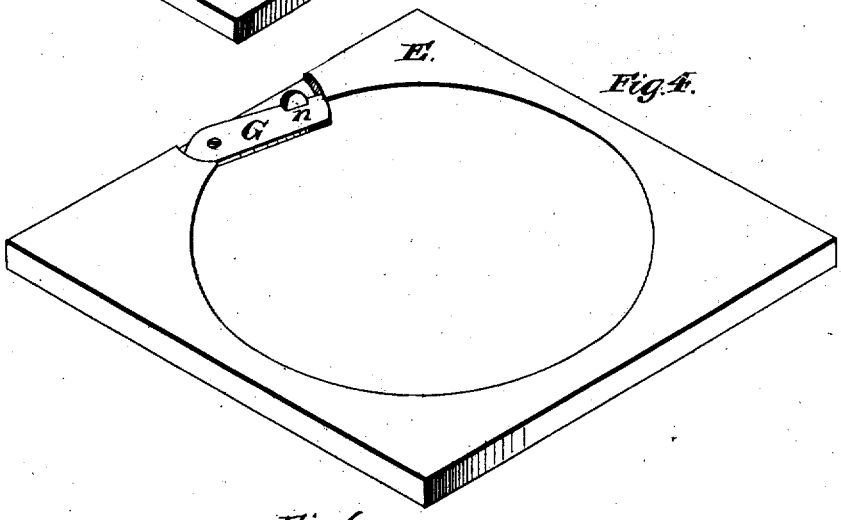
Figure 6:
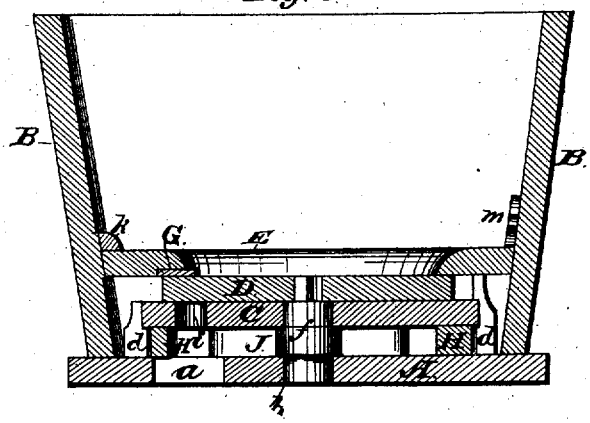

In the accompanying drawings, Figure 1 is a top-plan view of my seed-dropper. Fig. 2 is a vertical sectional view. Fig. 3 is a perspective view of the bottom of the seed-box, a fixed plate above it, and other parts hereinafter referred to. Fig. 4 is a perspective view, bottom side up, of the upper plate or cap over the seed-dropping disk. Fig. 5 is a top-plan view of one end of the reciprocating slide. Fig. 6 is a vertical sectional view in the line *x x* in Fig. 1.

My invention relates to the seed-measuring devices in the seed-boxes of corn-planters—measuring devices of that class in which a reciprocating slide is used to operate a rotative dropping disk or wheel.

In corn-planters of this class, as heretofore constructed, the reciprocating slide has been arranged to operate either on projections from the periphery or from the lower side of the dropping disk or wheel; and my invention consists, first, in the use of an intermediate wheel or pinion located beneath the dropping-disk, and adapted to receive motion from the slide by direct contact of the slide with its leaves or cogs, substantially as described, and for the purpose specified, and connected with the dropping-disk, so that it and the dropping-disk will rotate together in the same direction, and so that it may be removed and replaced while the disk is retained; second, in a pinion adapted to receive motion from a reciprocating slide, with a dropping disk or wheel attached to and above the pinion, and a fixed plate located between the pinion and dropping-disk; third, in a fixed plate located between the wheel or pinion, which receives motion from the slide and the dropping disk or wheel, and adapted to act as an upper bearing for the shaft of said pinion; fourth, in a wheel or pinion adapted to receive motion from the slide, and provided with a central shaft, which projects upwardly through a fixed plate, so that the dropping disk or wheel may be carried upon its upper end and above said fixed plate.

The invention further consists in a spring cut-off, which is so constructed and arranged as to permit it to yield in a plane parallel with the upper face of the dropping disk or wheel.

Referring to the drawings by letters, the same letter indicating the same part in the different views, A is a plate, which constitutes the upper part of the ordinary shoe or runner of a corn-planter and the bottom of the seed-box B. In the plate A is a suitable aperture, *a*, for the passage of seed to the shoe, and a central hole, *b*, which forms a lower bearing for the shaft of the dropping mechanism, hereinafter described. The plate A has standards *d* projecting from its upper side and near the corners of the seed-box, which standards have a plate, C, attached to them in such manner as to support it at its corners a short distance above the plate A, as shown in Figs. 2, 3, and 6 of the drawings. The plate C has an aperture, *i*, near one side, and immediately over the aperture *a* in the plate A.

*f* is a short vertical shaft, journaled near its upper end in the central part of the plate C, through which plate C it passes, and its lower end journaled in the hole *b* in the plate A, and its upper end above the plate C made square in cross-section for the reception of the dropping disk or wheel, which may be easily placed thereon or removed therefrom, and will be rotated with the shaft *f*. On the lower end of the shaft *f*, immediately below the plate C, is a four-armed wheel, J.

The dropping disk or wheel D is provided with eight circular seed-holes, *h h*, near its edge, and at equal distances apart, and is close to and above the plate C, and can be readily lifted off from the square end of the shaft *f*, and another substituted with larger or smaller seed-holes *h* without removing or displacing the arm-wheel J, and for the purpose of regulating the amount of seed to be dropped.

E is a top plate or cap, with a circular opening a trifle smaller than the wheel D, and is supported on the upper ends of the posts *d*, and held in place on one side by a cleat, *k*, and the other by an eccentric, *m*, as shown in the drawings.

G is a cut-off, pivoted in a recess in the under side of the top plate, E, and provided near its free end, on its outer edge, with a downwardly-projecting lug, *n*, which bears against a spring, *p*, secured in a box, *s*, formed on the bottom plate, C. The spring *p* forces the cut-off inward, so as to cover each hole *h* in the dropping-disk D as they are successionally brought to the cut-off by the rotation of the disk D. Each hole *h*, as it is brought beneath the cut-off G, is made to register with the hole *i* in the plate C, so that its contained seed will drop down into the shoe of the planter and be conveyed to the ground. The spring *p* will permit the cut-off to yield to any seed that may project upward from the seed-holes in the disk D.

H is a slide, located between the plates A and C, and may be moved back and forth by any suitable mechanism forming part of the planter. The central part of the slide H is cut out, so as to leave points *x*, with cam-faces *y* to one side of them, and cam-faces *y'* to their other sides, as shown at Fig. 5 of the drawings. The four-armed wheel J is within the opening in the slide H, so that at each stroke of the slide one of the cam-faces *y'* will act upon one of the arms of the wheel or pinion J, and rotate the wheel J, and thereby the dropping-disk D, one-eighth of a revolution, or until the next succeeding arm of the wheel J comes against the face *y* at the other side of the point *x*, and thereby arrests the motion of the wheels J and D, while a seed-hole, *h*, is beneath the cut-off and in position to discharge its contents.

At the return stroke of the slide H the wheels J and D are again rotated the one-eighth of a revolution in the same direction as before by the face *y'* at the other side of the opening in the slide, and their motion arrested by the adjacent face *y*, thus giving the dropping-disk an intermitting rotary motion in one direction, and bringing its seed-holes successionally beneath the cut-off and over the discharge *i*.

What I claim as new, and desire to secure by Letters Patent, is—

1. In corn-planter dropping mechanism, a pinion adapted to be actuated by the action of the reciprocating slide on and in contact with its leaves or cogs, and having the dropping disk or wheel removably attached to and above it, and so as to be rotated with said pinion, substantially as and for the purpose specified.

2. In corn-planter dropping mechanism, a pinion adapted to be actuated by the reciprocating slide, and having the dropping disk or wheel attached to and above it, and so as to be rotated with it, and a fixed plate located between said pinion and dropping-disk, substantially as and for the purpose specified.

3. The fixed plate C, located between the pinion J and dropping-disk D, and adapted to act as a bearing for the shaft *f*, substantially as described, and for the purpose specified.

4. In combination with a reciprocating slide, H, and dropping-disk D, the pinion J, rotated by the action of the slide on and in contact with its leaves, and having a shaft, *f*, projecting upward, and the dropping-disk D fixed upon its upper end, substantially as and for the purpose specified.

5. The cut-off G, adapted to yield in a plane parallel with the upper face of the dropping-disk D, and in combination with the dropping-disk D and cap E, substantially as and for the purpose specified.

6. The cut-off G, pivoted in a recess in the under side of the plate E, and provided with the lug *n*, to be operated upon by a spring, *p*, as and for the purpose specified.

7. The combination, with the box B, of the fixed plates C E, supported on the bottom A, and separated by the corner-posts *d d*, the wheels D J, arranged upon one shaft, and in the spaces above and below the plate C, and the slide H, with opening *x y*, as shown.

In testimony that I claim the foregoing I have hereunto set my hand this 8th day of January, 1879.

JOHN M. FORDEN.

Witnesses:
WILLIAM H. BOOTH,
H. H. ROGERS.